United States Patent [19]

Machida et al.

[11] Patent Number: 5,516,054
[45] Date of Patent: May 14, 1996

[54] ARMATURE COIL WINDING METHOD

[75] Inventors: Eiichi Machida; Hiroshi Hagiwara; Masato Iwata, all of Gunma, Japan

[73] Assignee: Mitsuba Electric Manufacturing Co., Ltd., Gunma, Japan

[21] Appl. No.: 240,678

[22] PCT Filed: Sep. 7, 1993

[86] PCT No.: PCT/JP93/01261

§ 371 Date: May 4, 1994

§ 102(e) Date: May 4, 1994

[87] PCT Pub. No.: WO94/06197

PCT Pub. Date: Mar. 17, 1994

[30]     Foreign Application Priority Data

Sep. 7, 1992  [JP]  Japan ..................... 4-265408

[51] Int. Cl.$^6$ ................ H02K 15/09; H02K 5/24; F04C 2/00
[52] U.S. Cl. ................ 242/433; 310/51; 418/151; 29/598; 29/901; 242/7.05 R; 74/573 R
[58] Field of Search ............... 242/7.03, 7.05 R, 242/7.05 A, 7.05 B, 7.05 C; 29/901, 596, 598; 310/51, 81, 206, 207, 208; 418/151

[56]     References Cited

U.S. PATENT DOCUMENTS

| | | | |
|---|---|---|---|
| 2,714,174 | 7/1955 | Applegate | 242/7.03 |
| 3,524,601 | 8/1970 | Biddison et al. | 242/7.03 |
| 4,833,353 | 5/1989 | Hansen | 74/573 R X |
| 4,915,554 | 4/1990 | Serizawa et al. | 418/151 X |
| 5,230,616 | 7/1993 | Serizawa et al. | 29/901 X |
| 5,251,833 | 10/1993 | Furuhashi et al. | 242/7.03 |
| 5,386,163 | 1/1995 | Heilman | 310/51 |

FOREIGN PATENT DOCUMENTS 58-123351  7/1983  Japan .

*Primary Examiner*—Michael R. Mansen

[57]     ABSTRACT

A method of winding an armature coil, wherein out of slots (S1–S12) of an armature core (12), slots (S5, S8) away from eccentric portions (13a, 14a) of first and second balancers (13, 14) which are disposed at opposite sides of the armature core (12) are designated as the slots in winding starting positions, respectively, and coils (16) are wound from the slots (S5, S8) into slots (S2, S11), so that the coils (16) are not brought into contact with the eccentric portions (13a, 14a).

2 Claims, 4 Drawing Sheets

ARMATURE COIL WINDING METHOD

TECHNICAL FIELD

This invention relates to a method of winding an armature coil, and more particularly to a technique of winding a coil around an armature core having balancers, which is effective in use for winding a coil around an armature in production of, for example, a motor to be mounted on a vehicle.

BACKGROUND ART

In production of a motor to be mounted on a vehicle, taking into account unbalance which is generated in a rotor of the motor when a load on the motor is, for example, a pump having an eccentric cam portion, disk-shaped balancers each having an eccentric portion away from a rotary center may be mounted on opposite sides of an armature core respectively. Both balancers are mounted on the outer periphery of a rotor shaft such that the centers of both balancers and a center of the rotor shaft are substantially contained in one plane. Mounting the balancers on opposite sides of the armature core, the rotational unbalance generated by the eccentric cam portion of the pump can be offset.

Conventionally, however, when coils are wound around the armature core, to the opposite sides of which the balancers are mounted, the coils are wound from optional slots of the armature core, and in the case that windings of the coils are started from such slots that the wires become in contact with the eccentric portions of the balancers, the coils are bulged outwardly by the eccentric portions of the balancers. Thus, as the coil wires continue to be wound in this state, they grow into portions being in contact with the outer peripheries of the balancers and portions being not in contact with them, and therefore, an unbalance mass is generated by the coil winding.

It is an object of the present invention to provide a method of winding an armature coil, which is capable of preventing an unbalance mass being produced by the coil winding.

DISCLOSURE OF THE INVENTION

In a method of winding an armature coil according to the present invention, coils are wound into slots of an armature core, which is mounted on an outer periphery of a rotor shaft of an armature; on opposite sides of the armature core, there being provided respectively disk-shaped balancers each having an eccentric portion away from a center of the rotor shaft and being mounted on the outer periphery of the rotor shaft in such a manner that the centers of both balancers and the center of the rotor shaft are substantially contained in a same plane, and the method is characterized in that:

out of a plurality of slots not facing the eccentric portions of both balancers and their bottoms being positioned generally parallel to the center line connecting centers of both balancers and the center of the rotor shaft, i.e., a plurality of slots, angles of which are within about ±45° to the vertical line to said center line, optional slots are designated as winding starting positions, and starting ends of the coils are disposed at these designated slots respectively, and the coils start to be wound from the slots at the winding starting positions into other slots respectively in such a manner that the coils become substantially in parallel to the above-described center line.

By the method of winding the armature coil according to the present invention as described above, when the coils are wound around the armature core, the positions away from the eccentric portions of the respective balancers are designated as the winding starting positions, and the coil are wound from the slots at these designated winding starting positions so that the coil do not come into contact with the eccentric portions in a state where the coils have been wound around the eccentric portions of both balancers. As a result, an unbalance mass by the coils can be prevented from existing in a state where the coils have been wound around the armature core.

BEST MODE FOR CARRYING OUT THE INVENTION

Figure 1:
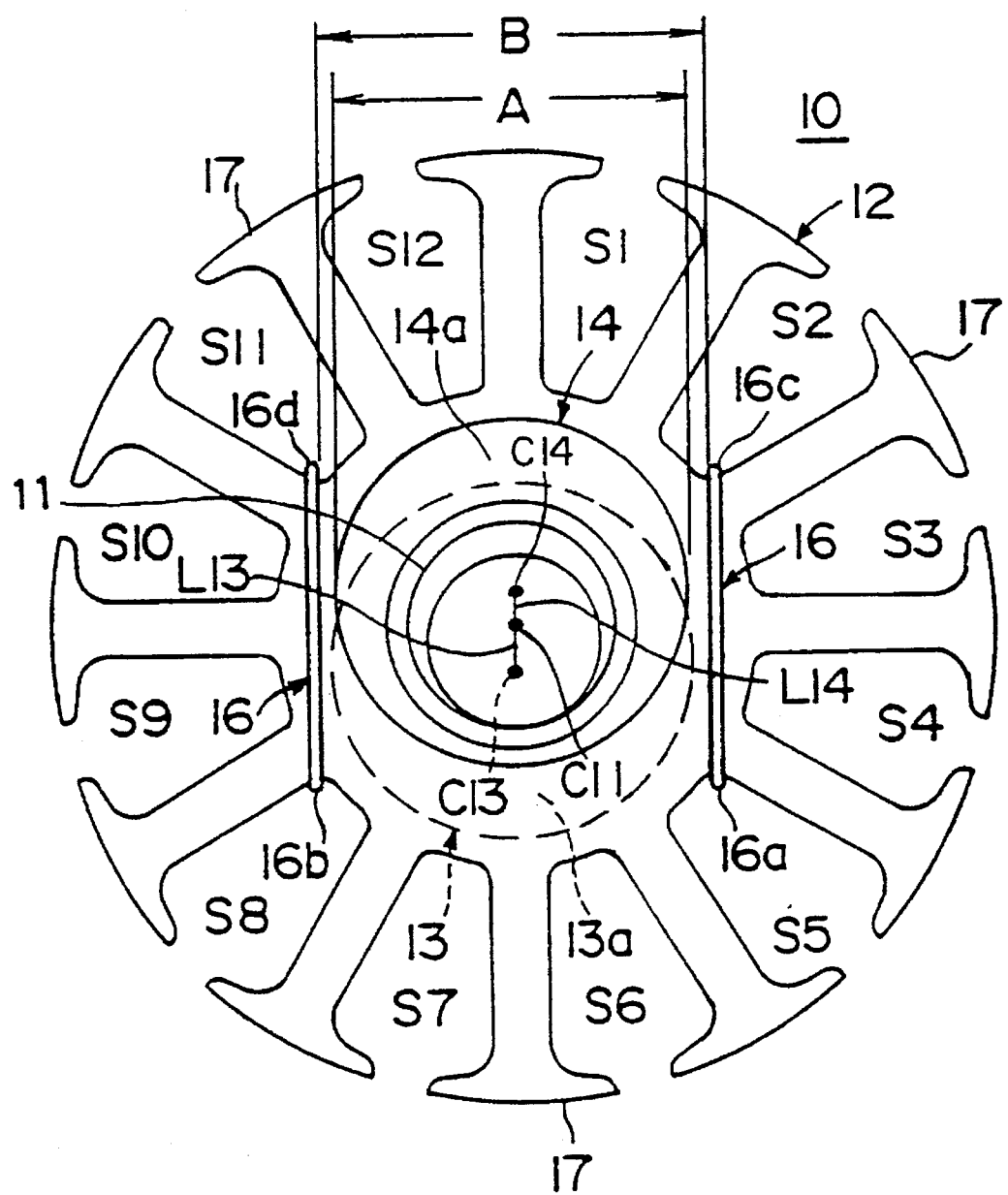
FIG. 1 is a front view showing the armature core and the winding starting positions, for explaining an embodiment of the method of winding the armature coil according to the present invention.
Figure 2:
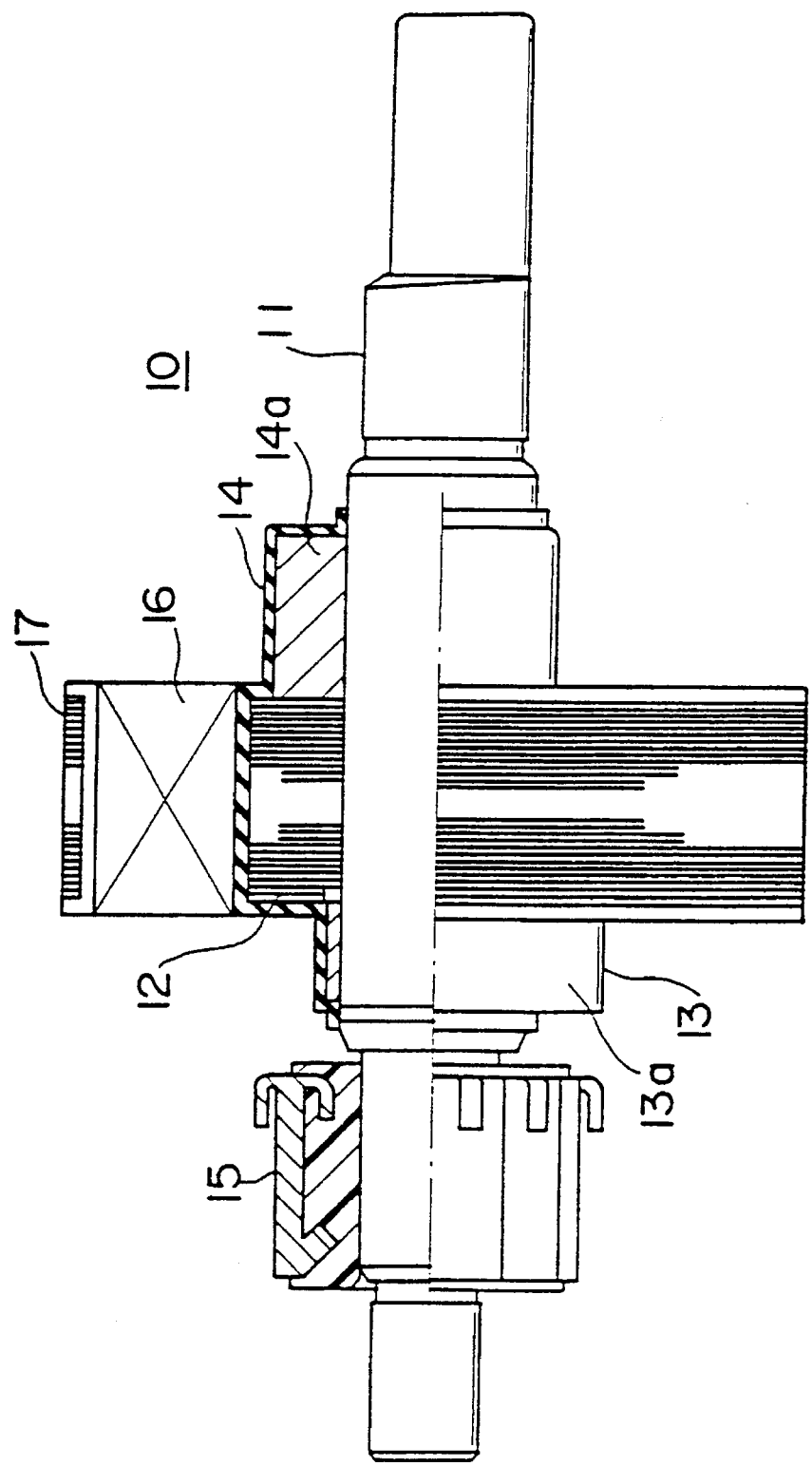
FIG. 2 is a side view showing the armature.
Figure 3:
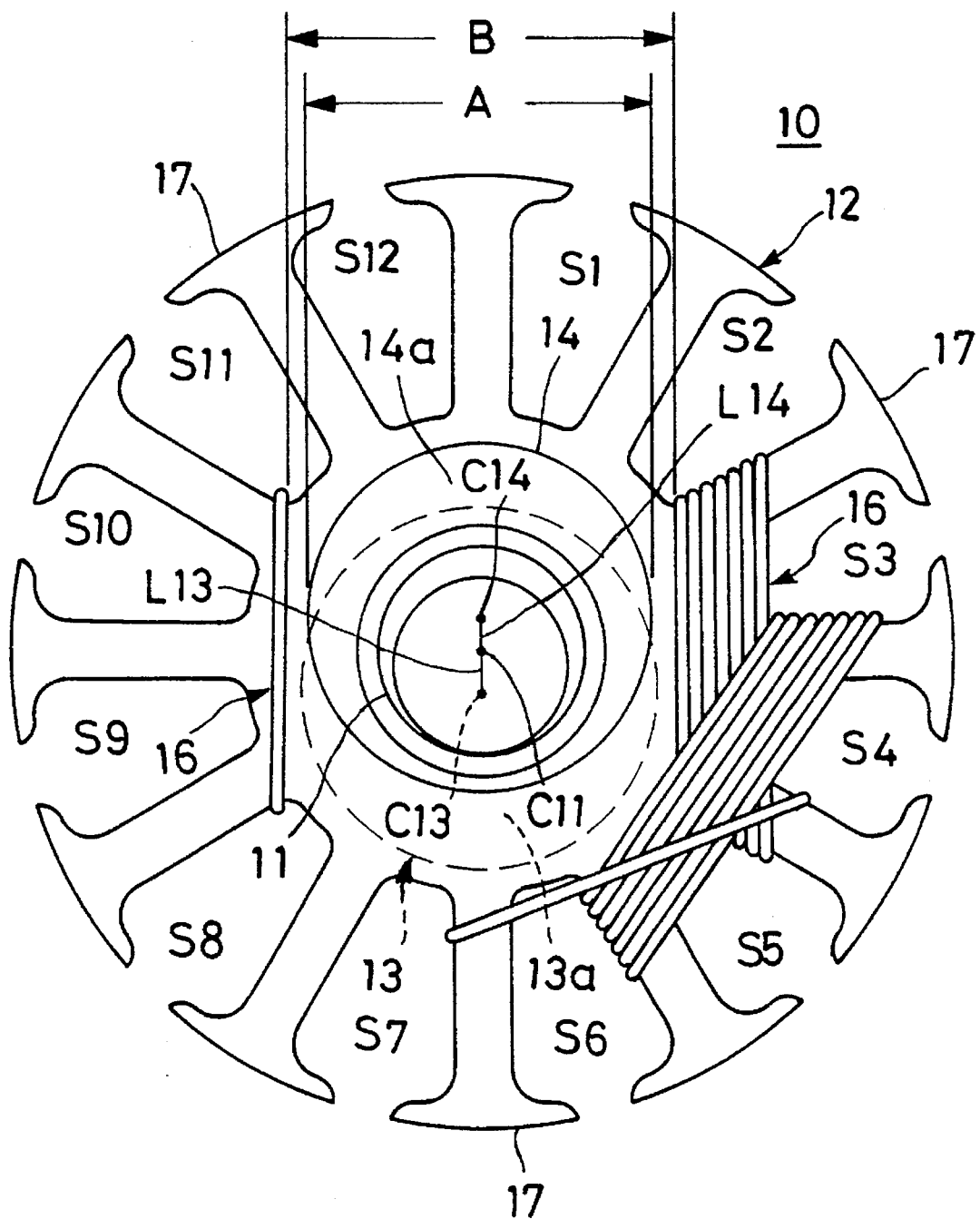
FIG. 3 is a front view showing a part of the coil during the winding.
Figure 4:
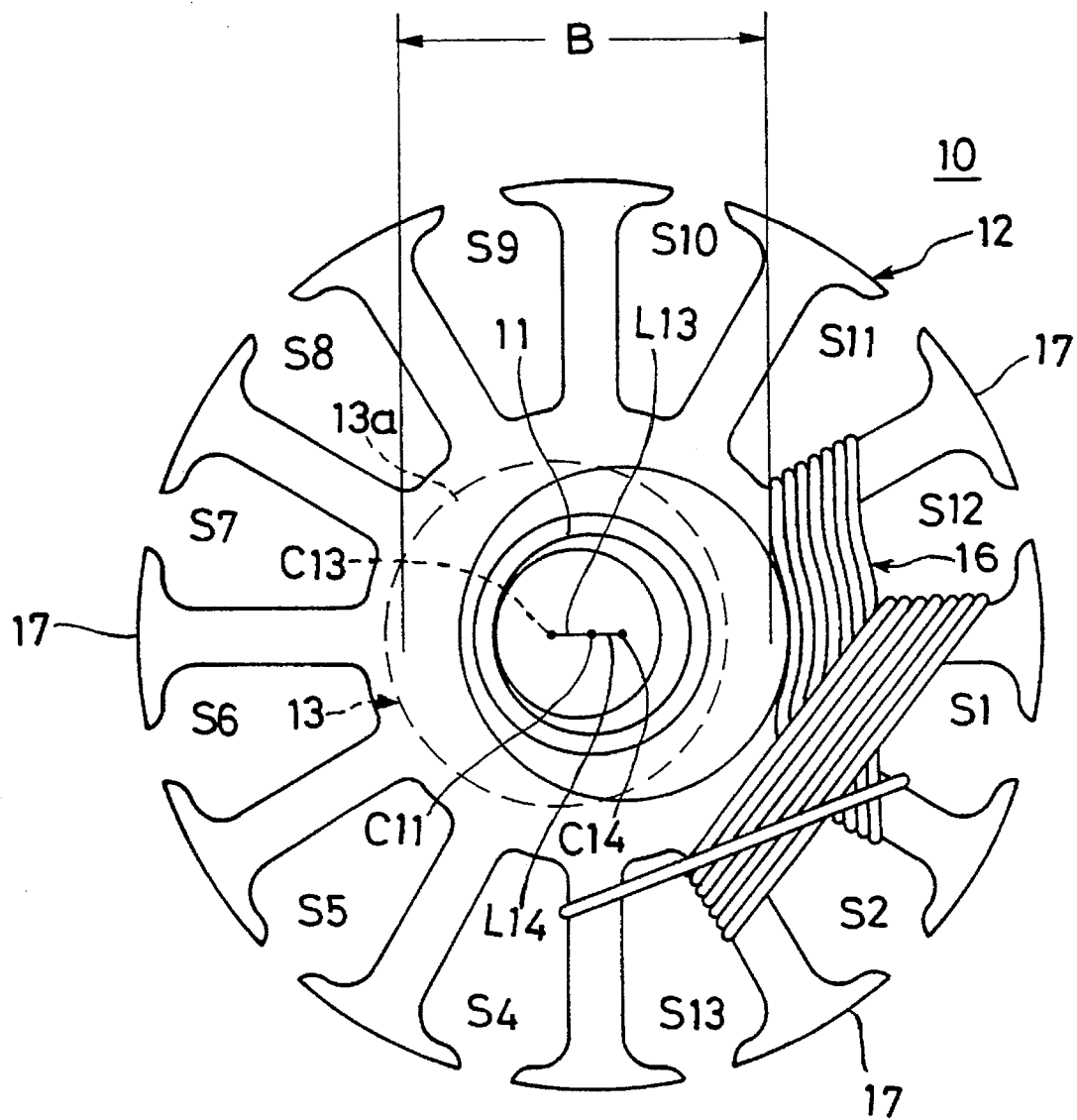
FIG. 4 is a front view showing a part of the coil during the winding according to the conventional technique.

In the illustrated embodiment, a method of winding an armature coil according to the present invention is used for winding coils around an armature in manufacturing a motor to be mounted on a vehicle. An armature core 12 is mounted to the central portion of a rotor shaft 11 of the armature 10. Furthermore, a first balancer 13 and a second balancer 14 are mounted on the rotor shaft 11 on the opposite sides of the armature core 12, respectively, and a commutator 15 is mounted adjacently to the first balancer 13.

Both balancers 13 and 14 are formed in disk-shapes having eccentric portions 13a and 14a away from the rotary centers, respectively. And, both balancers 13 and 14 are mounted on the outer periphery of the rotor shaft 11, respectively, so that centers C13 and C14 of both balancers 13 and 14, and a center C11 of the rotor shaft 11 are in the same plane.

Twelve projected portions 17 are arranged at equal intervals in the circumferential direction and projected outwardly in the radial direction on the armature core 12, and first to twelfth slots S1–S12 are formed between the projected portions 17 respectively. Coils 16 are wound through the respective slots.

When the coils 16 are wound through the respective slots S1–S12, out of the slots which are away from the eccentric portions 13a and 14a of both balancers 13 and 14, and whose angles are within about ±45° with respect to the vertical line to the center line connecting the centers C13 and C14 of the balancers 13 and 14 and the center C11 of the rotor shaft 11, the fifth slot S5 and the eighth slot S8 are designated as the slots in the winding starting positions in this embodiment.

That is, in this embodiment, in order to avoid contact of the coils 16 with the eccentric portions 13a and 14a at the winding starting positions of the coils 16 when the coils 16 are wound around the armature core 12, both balancers 13 and 14 are formed in such a manner that the distance B between the coils which are wound through the fifth slot S5 and the eighth slot S8 respectively becomes larger than the width A of both eccentric portions 13a and 14a.

Detailed description will hereunder be given of the method of winding the coils 16 around the armature core 12.

Firstly, the fifth slot S5 and the eighth slot S8 of the armature core 12 are designated as the slots in the winding starting positions, and a pair of winding starting ends 16a and 16b of the coils 16 are disposed at these designated positions, respectively. Subsequently, winding starting lines 16a–16c and 16b–16d which follow both winding starting ends 16a and 16b in the coils 16 are wound through the second slot S2 and the eleventh slot S11 respectively in such a manner that the winding starting lines 16a–16c and 16b–16d are brought into parallel with segments L13 and L14 which connect respectively the centers C13 and C14 of both balancers 13 and 14, to the center C11 of the rotor shaft 11.

The coils 16 are wound between the fifth slot S5 and the second slot S2, and between the eighth slot S8 and the eleventh slot S11, respectively, and thereafter, the coils 16 are wound between the sixth slot S6 and the third slot S3, and between the ninth slot S9 and the twelfth slot S12, respectively.

Next, the coils 16 are wound between the seventh slot S7 and the fourth slot S4, and between the tenth slot S10 and the first slot S1, respectively. After being wound successively as described above, the winding wire, which has begun to be wound between the fifth slot S5 and the second slot S2, is finally wound between the tenth slot S10 and the seventh slot S7, and the winding wire which has been wound between the eighth slot and the tenth slot is finally wound between the first slot and the fourth slot. When the winding is started and when the slots through which the coils are wound are changed, a given length of the wire is kept for lead wires for connecting the coils to the commutator although they are not shown.

When the coils 16 are wound according to the above-described method of winding, the coils are not brought into contact with the eccentric portions 13a and 14a of the balancers 13 and 14. Accordingly, the coils 16 can be prevented from being bulged due to the contact with the eccentric portions 13a and 14a, so that the unbalance mass by the coils 16 can be prevented.

As has been described hereinabove, according to the present invention, such a construction has been adopted that, in winding the coils around the armature core, the coils are wound avoiding the eccentric portions of the balancers provided on the opposite sides of the armature core, so that the unbalance mass by the coils can be prevented from being generated.

INDUSTRIAL APPLICABILITY

The method of winding the winding the armature coil according to the present invention is useful in adopting for winding the coils around the armature when the motor mounted on the vehicle is manufactured for example.

We claim:

1. A method of winding an armature wherein coils are wound into slots of an armature core mounted on a rotor shaft with two disk-shaped balancers located on opposite sides of the armature core, said balancers being mounted on the rotor shaft in such a manner that the two center axes of the two balancers and the center axis of the rotor shaft are substantially contained in a common plane, said slots having bases which are equally radially spaced from said center axis of the rotor shaft and on each side of said common plane two of said slots being starting slots separated from one another by at least one intervening other one of said slots and which starting slots are arranged such that a line connecting the bases of the two starting slots on each side of said common plane is generally parallel to said common plane and such that the two of said starting slot base connecting lines on the opposite sides of said common plane are spaced from one another by a distance greater than the diameter of each of said balancing disks, characterized by the steps of:

winding two initial coils onto said armature core respectively on opposite sides of said common plane, each of said initial coils being wound by winding a starting convolution passing between said bases of said two starting slots on the associated side of said common plane so that said starting convolution is generally parallel to said starting slot base connecting line of the associated two starting slots and out of engagement with said balancing disks, and then winding further convolutions passing between said two starting slots with said further convolutions of said initial coil on each side of said armature core covering an inner portion of said at least one slot intervening between the two of said starting slots; and thereafter winding additional coils onto said armature core between other pairs of said slots whereby the two slots of each of said other pairs are separated from one another by at least one other one of said slots, at least one of the two slots between which each of said additional coils is wound being one the inner portion of which is covered by a previously wound coil so that the convolutions of said additional cores are further spaced from said rotor shaft center axis than are said starting convolutions of said initial coils and are out of engagement with said balancing disks.

2. A method for winding coils on the poles of an armature core mounted onto a rotor shaft with said armature core and said rotor shaft having a common center axis, said armature core having a plurality of radially outwardly extending poles equally angularly spaced from one another about said center axis, said poles defining a plurality of radially extending slots of equal angular and radial extents located between adjacent pairs of said poles, said armature core having two oppositely directed side faces spaced from one another along said center axis and having associated with it a pair of balancing disks with generally cylindrical outer surfaces, each of said disks being located adjacent to a respective one of said side faces, and having a center axis radially spaced from the center axis of said armature core, said center axes of said two balancing disks being located on opposite sides of said center axis of said rotor shaft so that said two center axes of said balancing disks and said center axis of said armature core are located in a common plane, said slots of said armature core having bases all located at the same radial spacing from said center axis of said rotor shaft and said poles and slots being arranged so that, on one side of said common plane, a connecting line drawn from the base of a first one of said slots to the base of a second one of said slots, which first and second slots are separated from one another by a third one of said slots, is generally parallel to said common plane and so that, on the other side of said common plane, a connecting line drawn from the base of a fourth one of said slots to the base of a fifth one of said slots, which fourth and fifth slots are separated from one another by a sixth one of said slots, is generally parallel to said common plane, the diameters of said two balancing disks being less than the spacing between said two connecting lines and the maximum spacing between said outer cylindrical surfaces of said balancing disks as measured in said common plane being greater than said spacing between said two connecting lines, said winding method comprising:

winding two initial coils onto said armature core with one of said initial coils being wound between said first and second slots with its starting convolution residing at the bases of said first and second slots and with subsequent ones of its convolutions on opposite sides of said armature core covering an inner portion of said third slot, and with the other of said two initial coils being wound between said fourth slot and said fifth slot with its starting convolution residing at the bases of said fifth slot and said sixth slot and with subsequent ones of its convolutions on opposite sides of said armature core covering an inner portion of said sixth slot, so that said starting convolutions of said two initial coils are spaced from one another by a spacing greater than the diameters of said outer cylindrical surfaces of said two balancing disks and are spaced from said cylindrical surfaces of said disks, and thereafter winding further coils onto said armature core between other pairs of said slots separated from one another by an intervening one of said slots with at least one of the two slots between which each of said further slots is wound being a slot the inner portion of which is covered by a previously wound coil so that the starting convolution of each of said further coils is spaced further from said center axis of said rotor shaft than are the starting convolutions of said two initial coils and is out of engagement with said cylindrical surfaces of said disks.

* * * * *